(No Model.) 4 Sheets—Sheet 2.
B. MULLER.
BOX NAILING MACHINE.
No. 480,735. Patented Aug. 16, 1892.
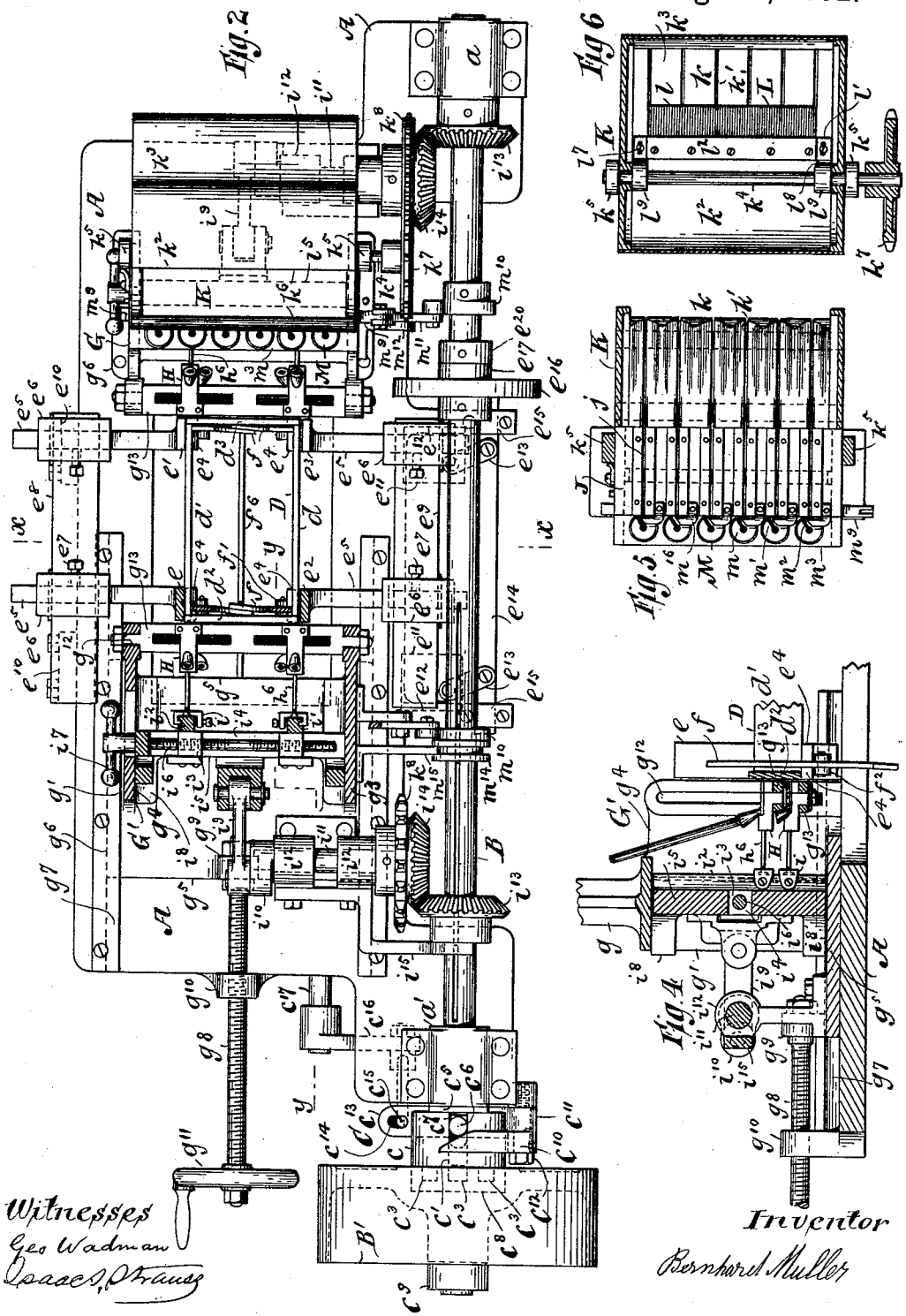
Witnesses
Geo Wadman
Isaac S. Strauss
Inventor
Bernhard Muller (No Model.) 4 Sheets—Sheet 3.

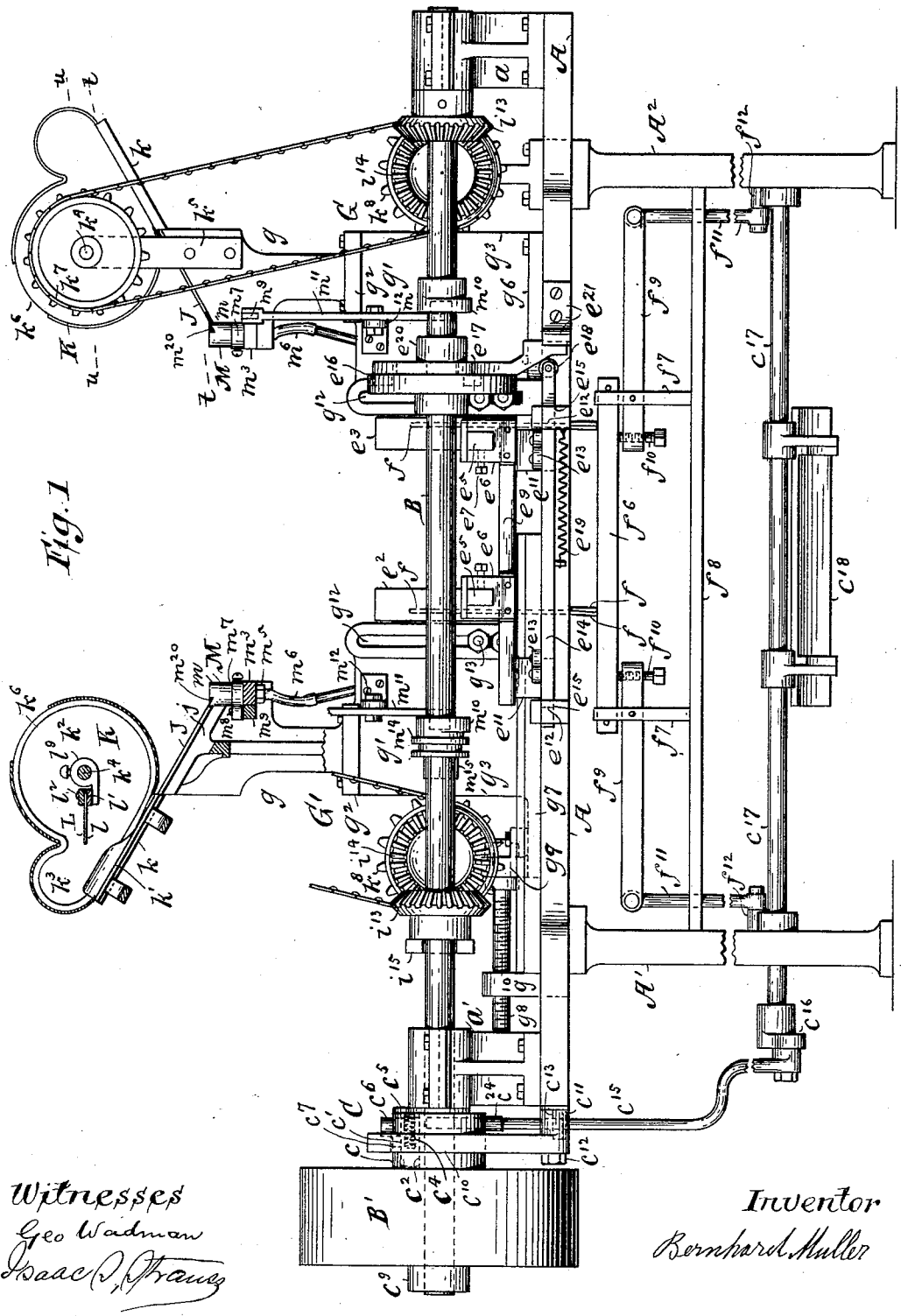

B. MULLER.
BOX NAILING MACHINE.

No. 480,735. Patented Aug. 16, 1892.

Witnesses
Geo. Wadman
Isaac D. Strauss

Inventor
Bernhard Muller (No Model.) 4 Sheets—Sheet 4.
B. MULLER.
BOX NAILING MACHINE.
No. 480,735. Patented Aug. 16, 1892.
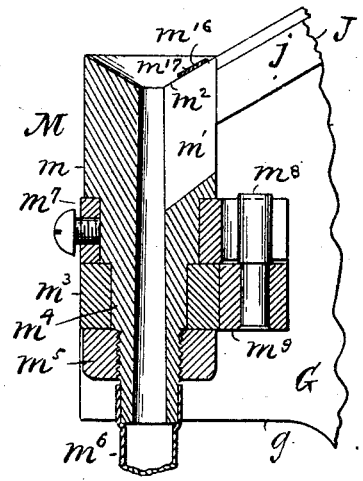
Fig. 8.
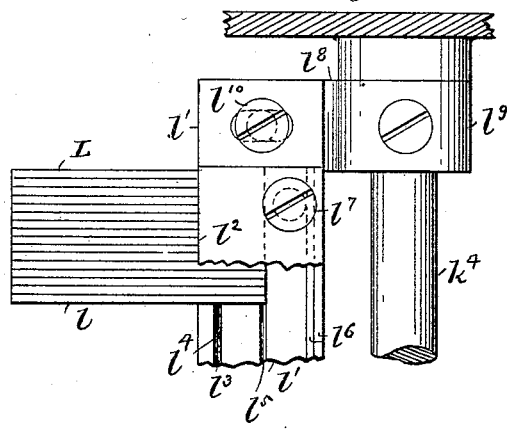
Fig. 10.
Fig. 11.
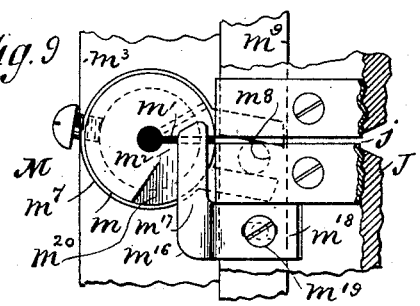
Fig. 9.
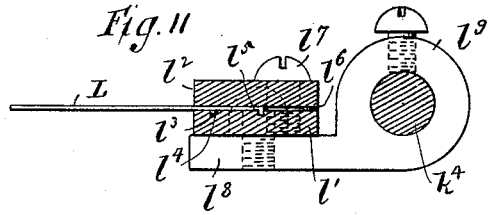
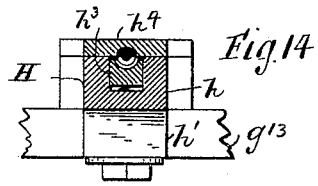
Fig. 14.
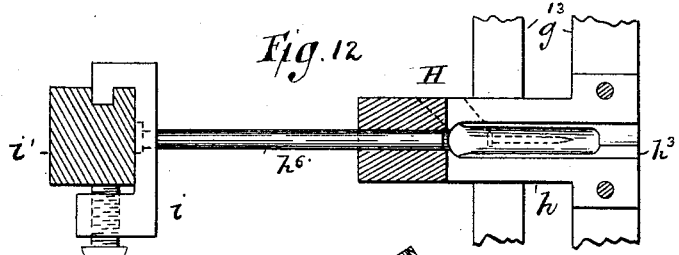
Fig. 12.
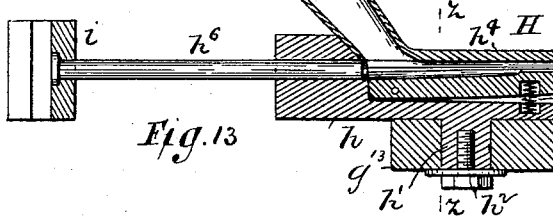
Fig. 13.
Witnesses
Geo. Wadman
Isaac Strauss
Inventor
Bernhard Muller
THE NORRIS PETERS CO., PHOTO-LITHO., WASHINGTON, D. C.

United States Patent Office.

BERNHARD MULLER, OF NEW YORK, N. Y., ASSIGNOR OF ONE-HALF TO BERTHA STRAUSS, OF SAME PLACE.

BOX-NAILING MACHINE.

SPECIFICATION forming part of Letters Patent No. 480,735, dated August 16, 1892.

Application filed August 31, 1891. Serial No. 404,262. (No model.)

*To all whom it may concern:*

Be it known that I, BERNHARD MULLER, a subject of the Emperor of Germany, residing at New York, in the county of New York and State of New York, have invented a new and useful Improvement in Box-Nailing Machines, of which the following is a specification.

I will describe a box-nailing machine embodying my improvements, and then point out the novel features in the claims.

Figure 7:
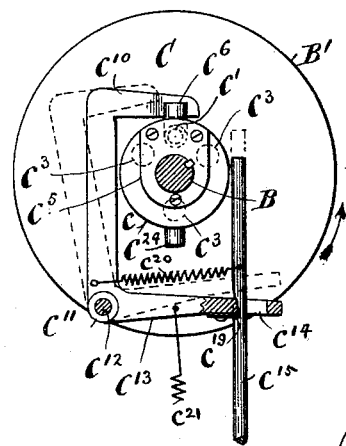
Figure 3:
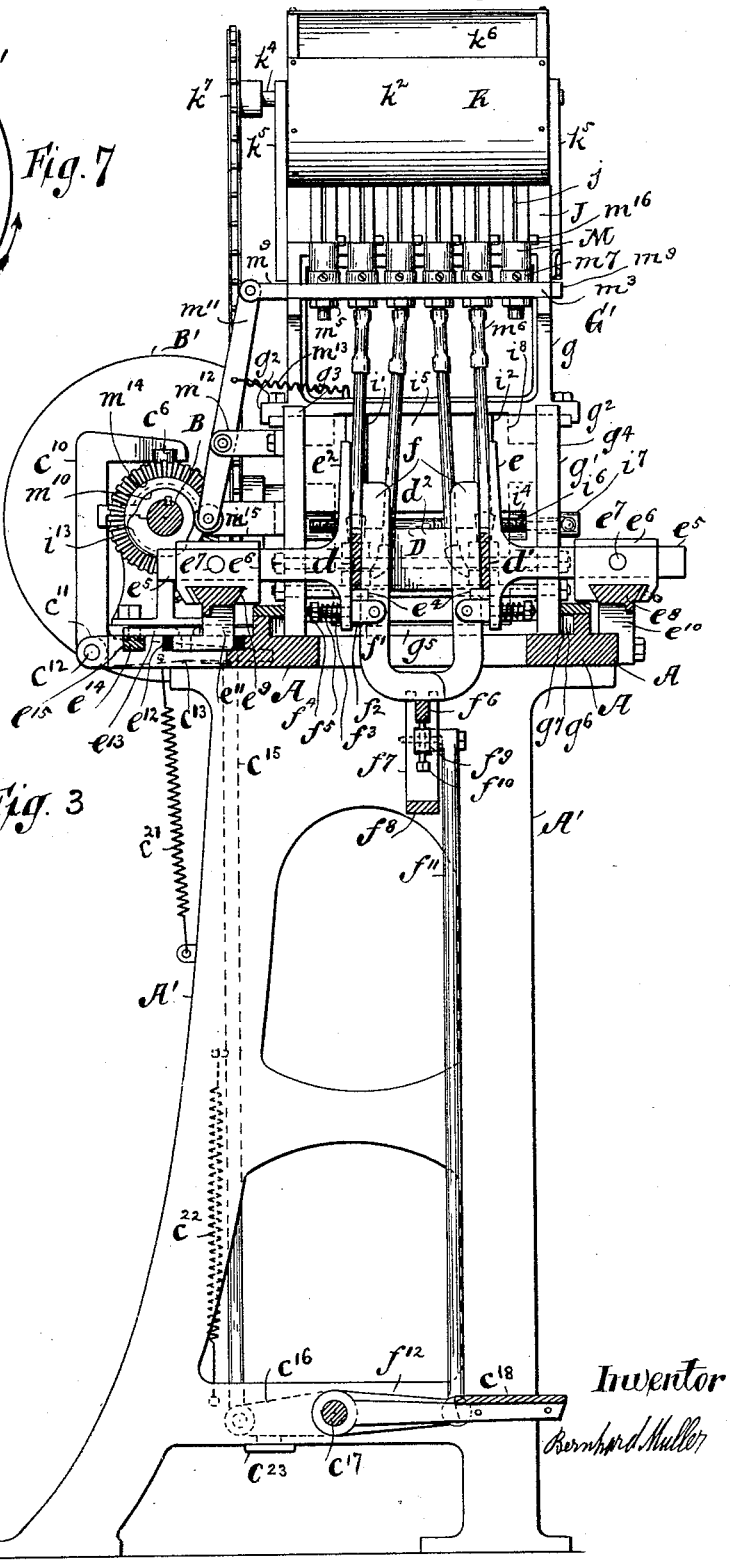

In the accompanying drawings, Figure 1 is a rear side elevation, partly in section, of a box-nailing machine constructed according to my invention. Fig. 2 is a plan, partly in section, of the same. Fig. 3 is a transverse vertical section thereof taken through the line $x\ x$, Fig. 2. Fig. 4 is a longitudinal vertical section taken through the line $y\ y$, Fig. 2, and showing certain parts. In Figs. 2, 3, and 4 I have shown portions of a box-frame arranged in position to be nailed by the machine. Figs. 5 and 6 are horizontal sections taken, respectively, through the lines $t\ t$ and $u\ u$, Fig. 1. Fig. 7 is an end view of certain clutch mechanism. Fig. 8 is a sectional side elevation through the center of one of the picker mechanisms. Fig. 9 is a top view thereof. Fig. 10 is a top view of a portion of a feeding device used in the machine. Fig. 11 is a vertical section thereof. Fig. 12 is a top view, partly in section, of one of the nail-chucks. Fig. 13 is a vertical central section thereof; and Fig. 14 is a transverse section through the line $z\ z$, Fig. 13.

Similar letters refer to similar parts throughout the several views.

A designates a bed-plate supported on and secured to legs $A'\ A^2$.

B is a driving-shaft supported in bearings $a\ a'$ and having a pulley $B'$ loosely mounted thereon and to which power is applied to rotate continuously.

C is a clutch device adapted to connect the shaft B to the pulley $B'$ and hold them in engagement during one complete revolution thereof and then automatically disconnect them. The clutch consists of a collar $c$, secured to the shaft B by a key or otherwise and having a pin $c'$, fitted to slide in an opening $c^2$, extending through the annular portion of the collar from side to side. The inner end of this pin is adapted to enter a socket $c^3$, formed in the hub of the pulley $B'$, and its outer end is made hollow or tubular for a suitable depth to receive a coil-spring $c^4$, which bears against a cover-plate or washer $c^5$, affixed to the side of the collar, and tends to force the pin $c'$ into the socket $c^3$.

$c^6$ is an arm of the pin $c'$ and integral therewith and which extends through a notch $c^7$ in the collar to a suitable distance beyond the periphery of the same.

The hub of the pulley $B'$ is provided with a bush $c^8$ of hard metal, shrunk or otherwise secured in a cavity therein. This bush contains the sockets $c^3$, preferably three in number, to facilitate a quick engagement of the pin $c'$ therewith.

$c^9$ is a collar secured to the shaft B to prevent longitudinal movement thereon of the pulley.

$c^{10}$ is a dog having an inclined end portion adapted to engage the arm $c^6$ of the pin $c'$ and withdraw the latter from engagement with a socket in the hub of the pulley $B'$ after the completion of a revolution of the shaft B. This dog $c^{10}$ extends from a hub $c^{11}$, loosely mounted on a stud-bolt $c^{12}$, affixed to the bed-plate A, the said hub having an arm $c^{13}$ extending from it approximately horizontal and provided with a slotted opening $c^{14}$ at its extremity for the reception of an upright rod $c^{15}$, pivotally connected to a crank-arm $c^{16}$, affixed to a rock-shaft $c^{17}$, having a treadle $c^{18}$ affixed thereto. The rod $c^{15}$ has a shoulder $c^{19}$ formed in its side, upon which rests the end portion of the arm $c^{13}$, the rod $c^{15}$ being held in close contact therewith by a spring $c^{20}$.

$c^{21}$ is a coil-spring having one end attached to the leg $A'$ and its other end attached to the arm $c^{13}$ and serves to hold the dog $c^{10}$ normally in a position to disengage the shaft from the pulley.

$c^{22}$ is a coil-spring having one end attached to the leg $A'$ and its other end attached to the rod $c^{15}$ and serves to lower the crank-arm $c^{16}$ upon a stop-plate $c^{23}$, secured to the leg $A'$, and consequently elevate and maintain the treadle in its uppermost position.

$c^{24}$ is a stud projecting from the collar $c$ and arranged to come in contact with the rod $c^{15}$ after the shaft B has commenced to rotate and push the said rod out of engagement with the arm $c^{13}$, and thereby allow the dog $c^{10}$ to be rocked into its normal position by the action of the spring $c^{21}$.

The operation of the clutch is as follows: The operator depresses the treadle, thereby raising the rod $c^{15}$ to a position shown dotted in Fig. 7. The arm $c^{13}$, resting on the shoulder $c^{19}$, is consequently elevated, causing the dog $c^{10}$ to be tilted to a position shown dotted in Fig. 7, thereby releasing the arm $c^6$ of the pin $c'$. This pin then slides into a socket of the pulley and motion is imparted to the machine. In order to release the dog $c^{10}$ from its tilted position independently of the treadle, which may continue to hold the rod $c^{15}$ in its uppermost position, the stud $c^{24}$ is provided. After a partial revolution of the shaft this stud releases the dog, and its inclined or wedge-shaped end portion is then rocked upon the collar $c^9$ in the path of motion of the arm $c^6$, as shown in Fig. 2. During the final portion of a revolution of the shaft the arm $c^6$ will come in contact with the dog adjacent to the point of the latter and be caused to move away from the pulley to the position shown in Fig. 2. The pin $c'$ is thereby withdrawn from the socket of the pulley and motion of the machine at once ceases.

D is a box-frame to be nailed, comprising two side pieces $d$ $d'$ and two end pieces $d^2$ $d^3$, resting loosely between two stationary gages $e$ $e'$ and two movable gage-bars $e^2$ and $e^3$ and upon lugs $e^4$, extending from the gage-bars. The gage-bars have each an arm $e^5$, fitted to slide in a box $e^6$ and adapted to be secured therein by a set-screw $e^7$ after the gage-bars have been adjusted to correspond, approximately, with the width of the box-frame D. The boxes $e^6$, containing the arms of the stationary gage-bars $e$ $e'$, and those containing the arms of the movable gage-bars $e^2$ $e^3$ are respectively fitted to a slideway $e^8$ and $e^9$, upon which they may be secured by set-screws after the gage-bars have been adjusted to correspond with the length of the box-frame D. The slideway $e^8$ is provided with standards $e^{10}$, which are secured to the bed-plate, and the slideway $e^9$ is provided with standards $e^{11}$, having flanges fitted to slide in grooves $e^{12}$, formed in the bed-plate, whereby a slight movement can be imparted to the gage-bars $e^2$ $e^3$ toward the gage-bars $e$ $e'$ sufficient to hold the box-frame D in proper position relatively to the nail-driving mechanism. This movement of the gage-bars $e^2$ $e^3$ is produced by a toggle device consisting of two links $e^{13}$, having one of their ends pivotally connected to the flanges of the standards $e^{11}$ and their other ends connected to a sliding bar $e^{14}$, whereby they may be straightened in a line at right angles to the bar $e^{14}$ and caused to push the gage-bars $e^2$ $e^3$ toward the gage-bars $e$ $e'$ and hold the end pieces $d^2$ $d^3$ firmly between them. The bar $e^{14}$ slides in guideways $e^{15}$, formed in projecting arms of the bed-plate, and is reciprocated in one direction by means of a cam $e^{16}$, affixed to the shaft B. This cam is provided with an annular groove on its face, adapted to impart an up-and-down motion to a bar $e^{17}$, which is slotted to embrace the shaft, and provided with rollers to engage in the upper and lower portions of the cam-groove. The lower end of this bar is inclined and bears against a roller $e^{18}$, mounted in the end of the bar $e^{14}$, which thereby receives motion in one direction by the downward motion of the bar $e^{17}$ and a motion in a reverse direction by means of a coil-spring $e^{19}$. The bar $e^{17}$ is retained in proper position by a collar $e^{20}$ and an arm $e^{21}$, secured to the bed-plate.

$f$ designates clamping-bars arranged to clamp the two side pieces $d$ $d'$ against the gage-bars, and they also serve to straighten them, if crooked. They are pivotally connected to yielding lugs $f'$, secured to the gage-bars beneath the lugs thereof supporting the box-frame D. Each of these lugs consists of a bifurcated head portion $f^2$, resting against a gage-bar and having a stem portion $f^3$ passing loosely through the same and provided with a nut $f^4$ and a coil-spring $f^5$, interposed between the nut and gage-bar. By this construction the clamping-bars $f$ will adapt themselves to side pieces $d$ $d'$ differing in thickness. The lower ends of these clamping-bars are bent into horizontal form to rest on a bar $f^6$, supported in notches formed on the upper ends of standards $f^7$, erected on a cross-bar $f^8$, secured to the legs A' A².

$f^9$ are levers fulcrumed between their ends to the standards $f^7$ and provided with screws $f^{10}$ at one end, capable of vertical adjustment and arranged beneath the bar $f^6$. The opposite ends of these levers $f^9$ are connected by rods $f^{11}$ to crank-arms $f^{12}$, affixed to the rock-shaft $c^{17}$. The pressure imparted to the treadle to operate the clutch and start the machine will also operate the clamping-bars $f$, as the difference in motion required to operate the two parts is compensated for by the adjusting-screws $f^{10}$.

G G' are two frames, each supporting similar sets of nail feeding, picking, and driving mechanisms and their appurtenances. The two frames are also alike, except that the frame G is secured stationary to the bed-plate and the frame G' is adjustably secured thereto, in order to facilitate the insertion and withdrawal of a box-frame D and also to adjust the parts of boxes differing in length. A description of one frame and its mechanisms will therefore apply to the other, except as to the difference mentioned. The frame G' contains an upper section $g$ and a lower section $g'$, secured together by flanges $g^2$. The lower section consists of two side walls $g^3$ $g^4$, united by a base-plate $g^5$, which projects beyond the walls, forming flanges $g^6$, by which the frame G is affixed to the bed-plate. The flanges $g^6$ of the frame G' are fitted to slide in ways $g^7$, formed on the bed-plate, by means of a screw $g^8$, pivotally connected to a lug $g^9$, extending from the base-plate $g^5$, and working in a screw-threaded lug $g^{10}$, extending from the bed-plate, beyond which it is provided with a hand-wheel $g^{11}$. The walls $g^3$ $g^4$ contain vertical slots $g^{12}$, into which two or more slotted cross-bars $g^{13}$ are secured. These cross-bars support nail-chucks H, which may be adjusted vertically by raising or lowering the cross-bars $g^{13}$ and horizontally by sliding them thereon. Each of the nail-chucks H (see Figs. 12 and 13) consists of a body-piece $h$, having a lug $h'$, fitting the slot in the cross-bar $g^{13}$ and secured therein by a screw $h^2$.

$h^3$ is a jaw fitting a groove in the body $h$ and pivoted thereto and having its free end held up against a cap portion $h^4$ by a spring $h^5$. The upper surface of this jaw is grooved to receive and guide nails in the path of a hammer $h^6$.

$h^7$ is an inlet for nails inclined sufficiently to admit of their free passage into the chuck. These inlets are arranged on the side portions of the chuck when the latter occupy a position beneath another chuck, as shown dotted in Fig. 12. The hammers $h^6$ are adjustably secured by clamps $i$ to vertical bars $i'$ $i^2$, having tapped lugs $i^3$, fitting a slideway $i^4$ in a reciprocating cross-head $i^5$.

$i^6$ is a right and left handed screw engaging the lugs $i^3$ to adjust the hammers horizontally by means of a handle $i^7$. The cross-head $i^5$ is provided with corner extensions $i^8$, fitted to slide on ways, and is reciprocated by a pitman $i^9$, attached to a crank $i^{10}$. The latter is secured to a shaft $i^{11}$, supported in bearings $i^{12}$ and deriving motion from the shaft B through the gear-wheels $i^{13}$ $i^{14}$. The gear-wheel $i^{13}$ of the frame G' is connected to slide on the shaft and is held in engagement with the gear-wheel $i^{14}$ by a forked arm $i^{15}$, secured to the bearings $i^{12}$. The upper section of the frames G and G' contains an ordinary inclined table J, having nail-slideways $j$ formed in it.

K is a hopper having an inclined bottom portion $k$, constructed in the usual manner, to cause nails to fall in and arrange themselves in grooves $k'$ and having a partially-cylindrical shell $k^2$, arranged over the front end of the bottom $k$ and opening into a covered space $k^3$, arranged above the rear end of the bottom $k$.

$k^4$ is a shaft journaled in standards $k^5$, secured to the frame, and upon which the hopper is loosely mounted and free to rock when required, in order to cause the contents to fall through an opening $k^6$. This shaft is provided with a sprocket-wheel $k^7$, deriving motion from the shaft B through the gear-wheels $i^{13}$ $i^{14}$ and sprocket-wheel $k^8$.

L is a brush secured to the shaft $k^4$, and when rotated thereby agitates the nails and throws them from the front end of the hopper to the rear end thereof, where they tend to fall in the grooves $k'$ and pass out of the hopper into the grooves $j$. This brush L (see Figs. 10 and 11) consists of a row of small resilient fingers $l$, of sheet metal, secured between bars $l'$ $l^2$. The confined ends of these fingers rest on a layer of fibrous material $l^3$, such as cotton, arranged in a groove $l^4$, and their extremities are slightly bent to enter a groove $l^5$. A layer of adhesive material—such as shellac—having been interposed between the fingers $l$ and bars $l'$ $l^2$ and strips $l^6$ of similar material as the fingers laid beyond the finger ends the two clamping-bars $l'$ $l^2$ are rigidly secured together by screws $l^7$. The bar $l'$ is extended to rest on and be secured to arms $l^8$ of collars $l^9$, secured to the shaft $k^4$. The extended portions of the bar $l'$ contain slotted holes for screws $l^{10}$ in order to radially adjust the brush.

M is a tubular picker arranged in front of each nail-slideway $j$, and it consists of a tube $m$, mounted to oscillate about a vertical axis in line with the said slideway $j$. This tube $m$ is provided with a radial side opening or notch $m'$ and an inclined surface slideway $m^2$ for the passage of nails.

$m^3$ is a cross-bar secured to the frame G and provided with circular openings, in which neck portions $m^4$ of the tubes $m$ are fitted to turn and which are secured in position by nuts $m^5$. These neck portions $m^4$ are extended downward to connect with a flexible chute $m^6$, leading to the nail-chucks.

$m^7$ is a yoke or annular ring adjustably secured to the tube $m$ and having bifurcated extensions to engage with pins $m^8$, projecting from a slide-bar $m^9$, reciprocated in one direction by the shaft B by means of a cam $m^{10}$, working against the end of a lever $m^{11}$, fulcrumed between its ends to a support $m^{12}$ and pivotally connected to the said bar $m^9$. The latter is reciprocated in a reverse direction by means of a spring $m^{13}$. The cam $m^{10}$, operating the bar $m^9$ in the frame G', has a sliding connection with the shaft B and is held in engagement with the lever $m^{11}$ by means of a grooved collar $m^{14}$, affixed to the cam $m^{10}$, and in which groove works an arm $m^{15}$, secured to the said frame.

$m^{16}$ is a stop-plate of thin sheet metal arranged in front of each slideway $j$ and in close proximity to the top inclined surface of the tube $m$. One end $m^{17}$ of this plate extends for a suitable distance past the opening $j$ and has its upper end corner rounded. Its other end $m^{18}$ is bent at right angles in order to rest upon the table J and be secured thereto by a screw $m^{19}$, passing through a slotted opening in the plate, in order to adjust the end $m^{17}$ toward the end of the slideway $j$ to correspond with the size of nails in use. When the notch $m'$ is in line with the slideway $j$, a nail slides into it and is caught under its head portion by the stop-plate $m^{16}$. As the tube is oscillated the side portion of the notch $m'$ pushes the nail sidewise sufficiently far to free its head portion from the stop-plate $m^{16}$, after which the nail slides down the inclined way $m^2$ and through the tube. A portion $m^{20}$ of the top surface of the tube is removed to admit of the oscillation of the latter beneath the plate $m^{16}$. The position of the notch $m'$ after the tube $m$ has been oscillated is indicated in Fig. 9 by dotted lines.

Having now described my invention, what I claim as new, and desire to secure by Letters Patent, is—

1. In a box-nailing machine, the combination, with a bed-plate, means for holding thereon a box-frame to be nailed, and a stationary and a movable frame, each supporting nail-feeding mechanism and having slotted rails $g^{13}$ adjustably secured thereto for supporting nail-chucks, of reciprocating cross-heads $i^5$, each provided with a right and left handed screw engaging with rails $i'$ $i^2$, resting against the cross-heads, and fitted to slide thereon and having hammers $h^6$ adjustably secured thereto, substantially as described.

2. In a box-nailing machine, the combination, with nail-driving mechanism, of horizontally-adjustable gages having lugs for supporting the work vertically and sliding arms adjustably secured in boxes connected adjustably to ways attached to the bed-plate, substantially as described.

3. In a box-nailing machine, the combination, with nail-driving mechanism, of a stationary slideway secured to the bed-plate for supporting gages sustaining the work on one side, a movable slideway secured in ways on the bed-plate for supporting gages sustaining the work on its other side, a toggle device for moving the latter gages against the work and comprising a sliding bar pivotally connected by links to the movable slideway, and suitable mechanism operated by the main shaft for reciprocating the sliding bar, substantially as described.

4. In a box-nailing machine, the combination, with gages for supporting a box-frame to be nailed, of clamping-bars fulcrumed between their ends to yielding lugs attached to the gages and arranged to press against the inside surfaces of the side pieces of the box-frame and hold the same securely against the gages and suitable mechanism for operating the clamping-bars, substantially as described.

5. In a box-nailing machine, the combination, with gage-bars for supporting a box-frame to be nailed, of clamping-bars pivotally connected to yielding lugs attached to the gage-bars and having bottom portions bent inwardly to rest on a cross-bar and means to impart a vertical and parallel motion to the said cross-bar to rock the clamping-bars simultaneously, substantially as described.

6. In a box-nailing machine, the combination of mechanism for operating both the clutch C and the clamping-bars $f$ from a treadle simultaneously, consisting of a shaft $c^{17}$, journaled in the legs A' A² and provided with the crank-arms $f^{12}$ and $c^{16}$, the arms $f^{12}$ being connected by rods to levers fulcrumed in stationary supports and provided with adjusting-screws bearing against the cross-bar $f^6$, to which a parallel motion upward, varying in extent, may be imparted, while the crank-arm $c^{16}$ is connected to the rod $c^{15}$ for operating the clutch, being held normally down against a stop-plate $c^{23}$ by a coil-spring $c^{22}$, substantially as described.

7. In a box-nailing machine, the combination, with an inclined slideway for nails contained in a table, as J, of a picker comprising a tube arranged against the front of the slideway and forming a stop for nails therein, the tube being mounted to oscillate about a vertical axis in line with the slideway and having its annular top surface provided with a notched inclined slideway coinciding with and forming a continuation of that of the table when oscillated in line therewith, a stop-plate adjustably secured to the table and arranged above the tube to admit and suspend a single nail within the notch thereof, and means for oscillating the tube, substantially as described.

8. In a box-nailing machine, the combination of a number of tubular pickers working in conjunction with stop-plates arranged above the same and mounted to oscillate in a cross-bar secured to the framework of the machine, yokes or annular rings adjustably secured to the said tubular pickers and having bifurcated extensions engaging with pins attached to a reciprocating bar, and suitable mechanism for operating the same, substantially as described.

9. In a box-nailing machine, a hopper for feeding nails and mounted to rock on standards secured to the framework of the machine, the hopper comprising a bottom portion adapted to cause nails to arrange themselves in grooves therein, a partially-cylindrical shell arranged above the front portion of the bottom thereof and opening into a covered space above the rear grooved portion thereof, and a brush composed of thin metallic and resilient fingers mounted to turn within the cylindrical portion and come in contact with the surface of the bottom of the hopper at its front end and throw nails toward the rear end thereof, substantially as described.

10. In a box-nailing machine, the combination, with the hopper K, of a brush adjustably secured to a shaft mounted to turn therein, the brush consisting of a row of thin metallic and resilient fingers $l$, resting on a layer of fibrous material contained in a groove in a bar $l'$ and having their ends bent to enter another groove in the bar $l'$, the fingers being held together by shellac or other adhesive material and by a bar $l^2$, clamped to the bar $l'$, substantially as described.

BERNHARD MULLER.

Witnesses:
GEO. WADMAN,
ISAAC S. STRAUSS.